3,054,254
Patented Sept. 18, 1962

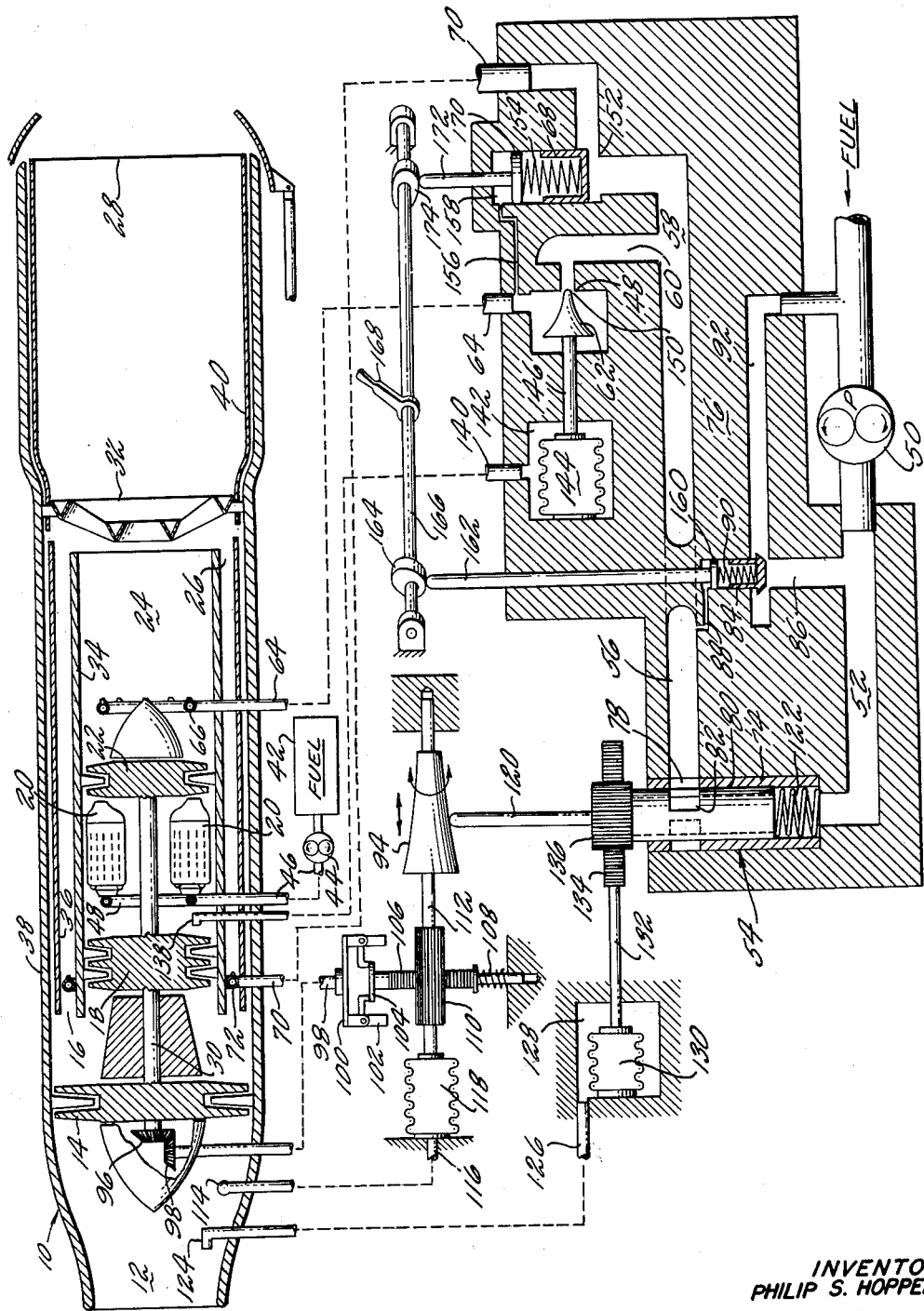

3,054,254
TURBOFAN AFTERBURNER FUEL CONTROL IMPROVEMENT
Philip S. Hopper, Manchester, Conn., assignor to United Aircraft Corporation, East Hartford, Conn., a corporation of Delaware
Filed Jan. 27, 1959, Ser. No. 789,303
3 Claims. (Cl. 60—35.6)

This invention relates to turbofan engine fuel controls, more particularly to the operation of the afterburner system for an afterburning turbofan engine.

In an afterburning turbofan engine, the ratio of the airflow through the bypass duct to the airflow through the turbine varies with operating conditions. Efficient afterburning requires that the distribution of afterburning fuel be in proportion to the airflow through these respective portions of the engine. The basic fuel control used with the invention is disclosed in application Serial No. 789,365, assigned to the assignee of the present application, and accomplishes this by metering a quantity of fuel proportional to the airflow rate through the fan, and then subtracting from this fuel flow an amount proportional to the airflow through the turbine. This last amount is injected into the gases leaving the turbine at the afterburner, while the remaining fuel is injected into the bypass air. In this way the fuel flow at both injection stations is proportioned to the airflow at the respective stations.

Performance of the turbofan afterburner indicates that a particular fuel proportioning schedule must be provided under variable augmentation conditions. In accordance with the present invention, rather than starting at a low overall fuel-air ratio and gradually increasing the ratio, it is preferable to augment from minimum to ideal stoichiometric fuel-air ratio on the internal portion of the dual afterburner system. Then, as augmentation increases toward maximum, the bypass fuel-air ratio is increased from minimum to ideal stoichiometric while the internal portion remains at the ideal stoichiometric fuel-air ratio.

The advantages of the augmentation schedule are significant. First, it is possible to use the gases discharging from the internal afterburner as a pilot light for the bypass burner. Secondly, the bypass burner will not maintain stable combustion alone at sea level static conditions because of the low temperatures present in the bypass duct, and initial afterburning in the internal afterburner eliminates this condition. Finally, from a durability standpoint for partial afterburning, the deterioration of the afterburner elements due to radiation and convection from hot gases is minimized.

An object of this invention, therefore, is to provide improved operation of the afterburner system of an afterburning turbofan engine.

Another object of the invention is to provide a turbofan engine fuel control system which correctly proportions internal afterburner fuel flow and bypass burner fuel flow under variable augmentation conditions.

Another object of the invention is to provide a turbojet engine afterburner fuel system in which fuel flow initially is proportioned to fan airflow rate and then divided between the internal afterburner and the bypass duct as a function of burner pressure in the turbojet portion of the engine, with the fuel flow to the internal afterburner and the bypass burner being selectively increased to give a predetermined fuel-air ratio in each.

Still another object of the invention is to provide a turbojet engine afterburner fuel system in which fuel flow initially is proportioned as a function of fan speed and fan inlet air temperature times fan inlet air pressure and then divided between the internal afterburner and the bypass duct as a function of the burner pressure in the turbojet portion of the engine with fuel flow to the internal afterburner being gradually increased with increasing augmentation from a minimum to ideal stoichiometric fuel-air ratio and with fuel flow to the bypass burner then being gradually increased with further increasing augmentation from a minimum to ideal stoichiometric fuel-air ratio while the internal afterburner remains at the ideal stoichiometric fuel-air ratio.

Other objects and advantages will be apparent from the following specification and claims, and from the accompanying drawing which illustrates an embodiment of the invention.

In the drawing:

The single FIGURE shows an afterburning turbofan engine having an afterburner fuel system in accordance with my invention.

The operating characteristic of a typical turbofan engine is such that the fan operates in a range where the corrected airflow is a unique function of the corrected fan speed, i.e.:

$$W_a \frac{\sqrt{\theta_2}}{\delta_2} = f_1\left(\frac{N_f}{\sqrt{\theta_2}}\right)$$

where:

$W_a$ = fan airflow
$\theta_2$ = fan inlet temperature
$\delta_2$ = fan inlet pressure
$N_f$ = fan speed.

Fan airflow then is expressed as:

$$W_a = \frac{\delta_2}{\sqrt{\theta_2}} \times f_1\left(\frac{N_f}{\sqrt{\theta_2}}\right)$$

which is equivalent to:

$$W_a = \delta_2 \times f_2(N_f, \theta_2)$$

In other words, if afterburner fuel flow is metered in proportion to the $f_2$ function of fan speed and fan inlet temperature times fan inlet pressure, the resulting afterburner fuel flow will be proportional to airflow through the fan. The fuel-air ratio for the fan thus will be constant.

Since the turbine nozzles would be choked during afterburner operating conditions, and since the temperature at the turbine nozzles is essentially constant over the operating range involved, the airflow through the turbojet portion of the engine can be considered to vary directly with the absolute pressure in the turbojet burner.

In accordance with the teachings of application Serial No. 789,365, fuel flow can be metered proportional to this pressure and injected into the gases leaving the turbine. The fuel-air ratio in this internal afterburner thus would be constant, its value depending on the proportions of the system. Subtracting this quantity of fuel from the fuel flow initially proportioned in accordance with fan airflow gives a remaining quantity of fuel which may be admitted to the fuel injection station in the bypass duct. Since the total afterburner fuel flow is proportioned to the total airflow and the internal afterburner is proportioned to the internal or turbine discharge flow then automatically by subtraction the bypass fuel is proportioned to the bypass airflow.

Referring to the drawing in detail, 10 indicates a turbofan engine having inlet 12, fan 14, bypass duct 16, compressor 18, burners 20, turbine 22, internal afterburner 24, bypass burner 26 and exhaust nozzle 28 in the direction of airflow through the engine. Turbine 22 is drivingly connected to compressor 18 and fan 14 by shaft 30. The flameholder 32 at the upstream end of exhaust nozzle 28 is provided to stabilize combustion in internal afterburner 24 and bypass burner 26. Radial elements of the afterburner flameholder propagate flame from the internal area to the bypass area of the afterburner.

Compressor 18, burners 20, turbine 22, and internal afterburner 24 are surrounded by casing 34 and together define, in effect, a turbojet unit within engine 10. Air entering inlet 12 and compressed by fan 14 is divided downstream of the fan with one part of the air entering bypass duct 16 and another part of the air entering compressor 18 and the turbojet unit. A small portion of the air flows between annular shield 36 and outer casing 38 for cooling purposes. A portion of this cooling air passes through an opening defined by the downstream end of shield 36 and the upstream end of annular shield 40 to mix with the afterburner gases. The remaining cooling air passes between shield 40 and casing 38 to be discharged into the air stream adjacent exhaust nozzle 28.

Fuel for burners 20 is supplied from tank 42 by pump 44 through conduit 46 to ring manifold 48 connecting the burners. The quantity of fuel flowing to the burners would be metered by a fuel control, not shown, which would be interposed in conduit 46 between pump 44 and ring manifold 48. A fuel control for this purpose is disclosed in copending application Serial No. 491,824 filed March 3, 1955, for Fuel Control for Jet Engine.

Fuel for the afterburner system of the engine is supplied when required from a tank, which may be tank 42, by pump 50 through passage 52 to metering valve 54. Metered fuel flows from the valve through passage 56 to chamber 58. Here the fuel is divided with one portion of the fuel flowing through passage 60 and past contoured valve 62 to conduit 64 and ring manifold 66 in internal afterburner 24. The other portion of the fuel flows from chamber 58 through regulating valve 68 to conduit 70 and ring manifold 72 located within and near the entrance to bypass duct 16. This location of the manifold has been determined to be the best for proper vaporization of the fuel for burning in bypass burner 26.

The metering of the fuel flow in the system and the apportionment of the fuel between afterburner manifold 66 and bypass manifold 72 will now be described. Metering valve 54 is a conventional multiplying window port valve and includes cylindrical liner 74 fixed in control casing 76 and having one or more ports 78 therein communicating with passage 56. Sleeve 80 is in sliding engagement with the interior of liner 74 and contains one or more ports 82 cooperating with ports 78. Through rotary and translational movement of the sleeve the effective area of the metering valve ports is defined.

The pressure drop across metering valve 54 is regulated by bypass valve 84. The lower side of the bypass valve is subject to the pressure on the upstream side of the metering valve by passage 86 connected to passage 52, while the upper side of the bypass valve is subject to the pressure on the downstream side of the metering valve by passage 88 connected to passage 56. Spring 90 loads the valve against the pressure in passage 86. Fuel bypassed by valve 84 is delivered through passage 92 to the inlet of pump 50.

Rotary motion and translatory motion are imparted to sleeve 80 in metering valve 54 to vary the effective area of the metering ports in accordance with fan speed, fan inlet temperature and fan inlet pressure in a manner to be described. Translatory motion is imparted to sleeve 80 from three-dimension cam 94 which is rotated in accordance with fan speed and translated in accordance with fan inlet temperature. Cam 94 is eccentrically mounted on shaft 112. Bevel gear 96 mounted on the forward end of shaft 30 drives gear shaft 98 which is connected to plate 100 carrying flyweights 102. The inner arm of the flyweights abuts shoulder 104 on rack 106 which is loaded in an upward direction by spring 108. Rack 106 meshes with pinion 110 mounted on shaft 112 which also carries eccentrically mounted three-dimension cam 94. Variations in fan rotational speed are reflected by displacement of the flyweights which movement is translated to the rack and pinion to rotate the three-dimension cam in accordance with the speed variations.

Fan inlet temperature is sensed by bulb 114 mounted in inlet 12 and connected by conduit 116 to temperature responsive bellows 118. One end of the bellows is fixed to the control casing and the opposite free end is connected to shaft 112. Thus, variations in fan inlet temperature result in expansion or contraction of bellows 118 which movement is transmitted to shaft 112 and three-dimension cam 94 to translate the cam. Follower 120 is connected to the upper end of sleeve 80 and is loaded against the surface of cam 94 by spring 122 at the bottom of the sleeve. Through the follower, any movement of cam 94 as the result of a change in fan speed or a variation in fan inlet temperature translates sleeve 80 to vary the effective area of metering ports 78 and 82 accordingly.

Fan inlet pressure is sensed by total pressure station 124 mounted in inlet 12. The pressure station is connected by conduit 126 to chamber 128 containing evacuated bellows 130. One end of the bellows is fixed to the control casing, which defines chamber 128, and the opposite free end of the bellows is connected to rod 132. The rod is connected to rack 134 which meshes with pinion 136 formed about the upper end of sleeve 80. Variations in fan inlet pressure result in expansion or contraction of bellows 130 which movement is transmitted through rod 132 and rack 134 to pinion 136 and sleeve 80 to rotate the sleeve and vary the effective area of metering ports 78 and 82 accordingly.

By virtue of the described structure which varies the effective area of metering valve 54 proportional to fan inlet pressure multiplied by the desired function of fan speed and fan inlet temperature, fuel flow is metered by the valve in proportion to the air flow through fan 14 and thus the fuel-air ratio for the fan will be substantially constant. The metered fuel delivered to passage 56 and chamber 58 remains to be apportioned between internal afterburner 24 and bypass burner 26.

Burner pressure in the turbojet unit is sensed by total pressure station 138 located downstream of compressor 18 adjacent burners 20. The pressure station is connected by conduit 140 to chamber 142 in the control casing. The chamber contains evacuated bellows 144, one end of which is fixed to the control casing. The opposite free end of the bellows is connected to rod 146 which is connected to valve 62. Valve 62 is a contoured needle valve which cooperates with seat 148 in the control casing to define the area of orifice 150 between passage 60 and conduit 64. Variations in burner pressure will expand or contract bellows 144 which movement is transmitted by rod 146 to valve 62 to vary the position of the valve with respect to its seat. Since the airflow through compressor 18 and the turbojet unit can be considered to vary directly with burner pressure, and since valve 62 is positioned in accordance with absolute burner pressure, the flow of fuel from chamber 58 through orifice 150 to afterburner ring manifold 66 is made proportional to compressor airflow by proper contouring of valve 62.

The remaining fuel in chamber 58 passes through regulating valve 68 to be injected into bypass duct 16 through ring manifold 72. Regulating valve 68 is loaded against seat 152 and the pressure in chamber 58 by spring 154. In addition, the pressure on the downstream side of burner pressure valve 62 is admitted through passage 156 to chamber 158 on the upper side of valve 68. Thus, valve 68 acts to regulate the pressure drop across burner pressure valve 62.

The amount of afterburning of fuel-air ratio in the bypass burner and afterburner can be varied in several ways. One way is to vary the loading on spring 90 behind bypass valve 84. Piston 160 abuts the upper end of spring 90, the piston being provided with openings, not shown, for the admission of fuel from passage 88 directly to valve 84. The piston is integrally connected with follower 162 which rides on the surface of cam 164. The cam is mounted on shaft 166 which also carries power lever 168. Actuation of the power lever by the engine operator will rotate the cam to variably adjust the loading on spring 90. As this load is varied the pressure drop across metering valve 54 will vary and more or less fuel will flow to passage 56 depending upon the change in spring loading. Assuming a constant loading on regulator valve 68, the variation of fuel flow to passage 56 and chamber 58 will vary the fuel-air ratio in the bypass duct.

Another way to vary the amount of afterburning is to vary the loading on spring 154 behind regulating valve 68. Piston 170 abuts the upper end of spring 154, the piston being provided with openings, not shown, for the admission of fuel from passage 156 directly to valve 68. The piston is integrally connected with follower 172 which rides on the surface of cam 174. The cam may be mounted on shaft 166 for coordinated movement with cam 164 when power lever 168 is actuated. Rotation of the cam variably adjusts the loading on spring 154 to vary the pressure drop across burner pressure valve 62. This will result in variation in the fuel-air ratio in the internal afterburner.

Through coordination of the rotation of cams 164 and 174 and through the selected contouring of the cams, particular afterburner fuel proportioning schedules may be provided under variable augmentation conditions. Testing of turbofan engines indicates that it is preferable to augment from minimum to ideal stoichiometric fuel-air ratio on internal afterburner 24 and then, as augmentation increases toward maximum, increase the fuel-air ratio in bypass burner 26 from minimum to ideal stoichiometric while maintaining the internal afterburner at the fixed ideal stoichiometric fuel-air ratio. This permits the internal afterburner gases to be used as a pilot light for the bypass burner, which would not maintain stable combustion alone at sea level static conditions, and, further, since a large portion of partial augmentation operation would be done on the internal afterburner, the deterioration of afterburner elements due to radiation and convection from hot gas would be minimized.

To accomplish the above described augmentation schedule, cams 164 and 174 are so indexed and contoured that spring 90 and valve 84 are lightly loaded and spring 154 and valve 68 are heavily loaded when afterburning is started. Due to the light loading on valve 84 the fuel flow through metering valve 54 is low and the high loading on valve 68 results in all of this fuel passing through valve 62 to internal afterburner 24. As power lever 168 is rotated to increase augmentation cam 174 will maintain the high loading on spring 154 while cam 164 will move follower 162 down to gradually build up the load on spring 90. The increased spring loading will increase the pressure drop across metering valve 54 and increase the flow of fuel to chamber 58 and to internal afterburner 24.

Thus, as augmentation increases after afterburner operation has been started, fuel flows solely to internal afterburner 24 and this flow gradually is increased by increasing the load on bypass valve 84. Fuel flow to the internal afterburner will increase until the fuel-air ratio therein has been increased to the value giving the ideal stoichiometric fuel-air ratio.

As augmentation is increased through further rotation of power lever 168 the loading on bypass valve 84 gradually increases since cam 164 is contoured to gradually depress follower 162 as the power lever is rotated from the position of minimum augmentation to the position of maximum augmentation. From minimum augmentation until the point where ideal stoichiometric fuel-air ratio has been achieved in internal afterburner 24, cam 174 maintains a high loading on spring 154. Beyond this point the cam is contoured so that the loading on spring 154 and regulating valve 68 gradually is reduced from the high value initially established. This will permit fuel to flow to bypass manifold 72 and the flow rate will be gradually increased through the coordinated action of cams 164 and 174 until the ideal stoichiometric fuel-air ratio has been achieved in the bypass burner and with the established stoichiometric fuel-air ratio in the internal afterburner being maintained. Thus at maximum augmentation both the internal afterburner and the bypass burner are operating at stoichiometric fuel-air ratios, having reached this point of operation through the selective control of fuel flow.

It is to be understood that the invention is not limited to the specific embodiment herein illustrated and described, but may be used in other ways without departure from its spirit as defined by the following claims.

I claim:

1. The method of operating the afterburner system of a turbofan engine having an internal afterburner, a bypass burner external of and extending along at least part of the internal afterburner, said bypass burner being in heat exchange relation with said internal afterburner, and an afterburner fuel system including metering means, first spring loaded means for regulating the pressure drop across said metering means, means controlling the admission of metered fuel to said afterburner and second spring loaded means controlling the admission of metered fuel to said bypass burner, including the steps of first establishing a relatively high loading on said second spring loaded means, next gradually increasing the loading on said first spring loaded means until the fuel-air ratio in said internal afterburner reaches a predetermined value, and then gradually increasing the loading on said first spring loaded means while gradually decreasing the loading on said second spring loaded means until the fuel-air ratio in said bypass burner reaches a predetermined value whereby the air in said bypass burner is heated prior to the initiation of burning therein.

2. In the afterburner system of a turbofan engine having an internal afterburner, a bypass burner external of and extending along at least part of the internal afterburner, said bypass burner being in heat exchange relation with said internal afterburner, and an afterburner fuel system including metering means, first spring loaded means for regulating the pressure drop across said metering means, means controlling the admission of metered fuel to said afterburner and second spring loaded means controlling the admission of metered fuel to said bypass burner, the improvement of means establishing a relatively high loading on said second spring loaded means, means for gradually increasing the loading on said first spring loaded means until the fuel-air ratio in said internal afterburner reaches a predetermined value, and means for gradually increasing the loading on said first spring loaded means while gradually decreasing the loading on said second spring loaded means until the fuel-air ratio in said bypass burner reaches a predetermined value whereby the air in said bypass burner is heated prior to the initiation of burning therein.

3. In an afterburner system for a turbofan engine having a power lever, an internal afterburner, a bypass burner external of and extending along at least part of the internal afterburner, said bypass burner being in heat exchange relation with said internal afterburner, and an afterburner fuel system including metering means; first spring loaded means for regulating the pressure drop across said metering means, first cam means for varying the loading on said first spring loaded means, means controlling the admission of metered fuel to said internal afterburner, second spring loaded means controlling the admission of metered fuel to said bypass burner, second cam means for varying the loading on said second spring loaded means, means operatively connected with said power lever for rotating said first cam means to gradually increase the loading on said first spring loaded means as said power lever is moved from minimum augmentation position to maximum augmentation position, means for maintaining a predetermined loading on said second spring loaded means as said power lever is moved from minimum augmentation position to an intermediate position, and means operatively connected with said power lever for rotating said second cam means to gradually decrease the loading on said second spring loaded means as said power lever is moved from said intermediate position to maximum augmentation position whereby the air in said bypass burner is heated prior to the initiation of burning therein.

References Cited in the file of this patent

UNITED STATES PATENTS

| | | |
|---|---|---|
| 2,422,208 | Stokes | June 24, 1947 |
| 2,498,939 | Bobier | Feb. 28, 1950 |
| 2,508,420 | Redding | May 23, 1950 |
| 2,830,436 | Coar | Apr. 15, 1958 |
| 2,847,821 | Brown | Aug. 19, 1958 |
| 2,850,873 | Hausmann | Sept. 9, 1958 |
| 2,857,739 | Wright | Oct. 28, 1958 |
| 2,879,643 | Stroh et al. | Mar. 31, 1959 |
| 2,887,845 | Hagen | May 26, 1959 |
| 2,916,876 | Colley et al. | Dec. 15, 1959 |
| 2,929,203 | Henning | Mar. 22, 1960 |
| 2,979,900 | Hopper | Apr. 18, 1961 |